United States Patent
Thomas et al.

(10) Patent No.: US 9,629,000 B2
(45) Date of Patent: Apr. 18, 2017

(54) METHODS AND APPARATUS FOR ANTENNA ELEVATION DESIGN

(71) Applicant: Nokia Solutions and Networks Oy, Espoo (FI)

(72) Inventors: Timothy Thomas, Palatine, IL (US); Frederick Vook, Schaumburg, IL (US); Eugene Visotsky, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/893,129

(22) PCT Filed: Jun. 4, 2013

(86) PCT No.: PCT/US2013/044086
§ 371 (c)(1),
(2) Date: Nov. 23, 2015

(87) PCT Pub. No.: WO2014/196962
PCT Pub. Date: Dec. 11, 2014

(65) Prior Publication Data
US 2016/0127920 A1    May 5, 2016

(51) Int. Cl.
*H04M 1/00* (2006.01)
*H04W 16/28* (2009.01)
(Continued)

(52) U.S. Cl.
CPC .......... *H04W 16/28* (2013.01); *H04B 7/0617* (2013.01); *H04B 7/10* (2013.01)

(58) Field of Classification Search
CPC ..... H04W 16/00; H04W 16/18; H04W 16/24; H04W 16/28; H04W 16/32; H04W 28/00; H04W 24/02; H04B 7/0617; H04B 7/10
(Continued)

(56) References Cited

U.S. PATENT DOCUMENTS

| | | | |
|---|---|---|---|
| 6,311,075 B1 * | 10/2001 | Bevan | H01Q 1/246 342/368 |
| 2003/0073463 A1 * | 4/2003 | Shapira | H01Q 1/246 455/562.1 |

(Continued)

FOREIGN PATENT DOCUMENTS

| | | |
|---|---|---|
| JP | 2009-522885 | 6/2009 |
| KR | 10-2008-0089522 | 10/2008 |
| WO | WO 2007/059496 A2 | 5/2007 |

OTHER PUBLICATIONS

3GPP TR 37.840 V12.0.0 (Mar. 2013), "$3^{rd}$ Generation Partnership Project; Technical Specification Group Radio Access Network; Study of Radio Frequency (RF) and Electromagnetic Compatibility (EMC) requirements for Active Antenna Array System (AAS) base station (Release 12)", 84 pgs.

*Primary Examiner* — Jean Gelin (74) *Attorney, Agent, or Firm* — Harrington & Smith (57) ABSTRACT

Systems and techniques for elevation beam design. Characteristics, such as number, distribution, and geographical location of elements subject to interference by elevation beams of a base station are analyzed, and a configuration for an antenna array is determined so as to create a set of elevation beams directed so as to avoid interference with the elements subject to interference by the base station. Configuration may, for example, include configuration of the antenna array so as to create a set of elevation beams exhibiting nulls and sidelobes in appropriate locations and at appropriate angles so as to avoid interference.

18 Claims, 9 Drawing Sheets

(51) Int. Cl.
*H04B 7/06* (2006.01)
*H04B 7/10* (2017.01)

(58) Field of Classification Search
USPC .......... 455/446, 447, 449, 561, 562.1, 63.1, 455/63.2, 63.4
See application file for complete search history.

(56) References Cited

U.S. PATENT DOCUMENTS

| | | | | |
|---|---|---|---|---|
| 2006/0223443 | A1* | 10/2006 | Reudink | H04W 16/10 455/67.11 |
| 2007/0135051 | A1* | 6/2007 | Zheng | H04B 7/18563 455/63.1 |
| 2010/0048218 | A1* | 2/2010 | Gale | H01Q 1/246 455/450 |
| 2010/0311457 | A1* | 12/2010 | Johansson | H01Q 1/005 455/517 |
| 2011/0032173 | A1* | 2/2011 | Chang | H01Q 3/04 343/880 |
| 2011/0212695 | A1 | 9/2011 | Wild et al. | 455/73 |
| 2012/0129575 | A1* | 5/2012 | Kenington | H04B 7/0617 455/561 |
| 2014/0274076 | A1* | 9/2014 | Hyslop | H04W 16/24 455/446 |
| 2014/0355702 | A1* | 12/2014 | Thomas | H04L 5/0032 375/267 |
| 2016/0013848 | A1* | 1/2016 | Wernersson | H04B 7/0617 370/329 |

* cited by examiner

METHODS AND APPARATUS FOR ANTENNA ELEVATION DESIGN

TECHNICAL FIELD

The present invention relates generally to wireless communication. More particularly, the invention relates to improved systems and techniques for elevation beamforming in a base station.

BACKGROUND

As the number of wireless cellular data communication devices continues to increase and as their data capabilities continue to be more and more heavily used, the demands on available infrastructure and frequencies continue to increase. The addition of infrastructure to meet demand is costly, and is becoming more and more difficult as unoccupied space suitable for placement of larger base stations diminishes. In addition, as saturation of available wireless communication frequencies approaches, addition of conventional infrastructure approaches a point of ineffectiveness.

In order to support the growing demand for data communication services, therefore, network operators are turning more and more to managing existing resources, particularly frequency resources, so as to increase the number of users served by the resources. In order to accomplish such an increase, operators are constantly seeking to increase the efficiency of their use of resources, and one approach to such an increase in efficiency is through control of the elevation of radio frequency (RF) beams to perform vertical sectorization—that is, to control the elevation pattern of an RF beam so as to define additional sectors beyond those that can be defined simply through control of azimuth.

SUMMARY

In one embodiment of the invention, an apparatus comprises at least one processor and memory storing computer program code. The memory storing the computer program code is configured to, with the at least one processor, cause the apparatus to at least control radiation characteristics of a base station operating in a wireless network, wherein controlling the radiation characteristics of the base station comprises selecting at least one beam of a set of beams for emission by an antenna panel of the base station comprising multiple elements arrayed in an elevation dimension, wherein the at least one beam of the set of beams is chosen to as to reduce interference in the elevation dimension between areas inside the cell and outside the cell, for both reception and transmission.

In another embodiment of the invention, a method comprises controlling radiation characteristics of a base station operating in a wireless network, wherein controlling the radiation characteristics of the base station comprises selecting at least one beam of a set of beams for emission by an antenna panel of the base station comprising multiple elements arrayed in an elevation dimension, wherein the at least one beam of the set of beams is chosen to as to reduce interference in the elevation dimension between areas inside the cell and outside the cell for both transmission and reception.

In another embodiment of the invention, a computer-readable medium stores a program of instructions. Execution of the program of instructions by a processor configures an apparatus to at least control radiation characteristics of a base station operating in a wireless network, wherein controlling the radiation characteristics of the base station comprises selecting at least one beam of a set of beams for emission by an antenna panel of the base station comprising multiple elements arrayed in an elevation dimension, wherein the at least one beam of the set of beams is chosen to as to reduce interference in the elevation dimension between areas inside the cell and outside the cell for both transmission and reception.

In another embodiment of the invention, an apparatus comprises at least one processor and memory storing computer program code. The memory storing the computer program code is configured to, with the at least one processor, cause the apparatus to at least control radiation characteristics of a base station operating in a wireless network. Controlling the radiation characteristics of the base station comprises selecting at least one beam of a set of beams for emission by an antenna panel of the base station. The antenna panel comprises multiple elements arrayed in an elevation dimension. The at least one beam of the set of beams is chosen to as to reduce interference radiated outside the cell in the elevation dimension.

In another embodiment of the invention, an apparatus comprises at least one processor and memory storing computer program code. The memory storing the computer program code is configured to, with the at least one processor, cause the apparatus to at least control radiation characteristics of a base station operating in a wireless network. Controlling the radiation characteristics of the base station comprises selecting at least one beam of a set of beams for emission by an antenna panel of the base station. The antenna panel comprises multiple elements arrayed in an elevation dimension. The at least one beam of the set of beams is chosen to as to attenuate interference received from outside the cell in the elevation dimension.

DETAILED DESCRIPTION:

Embodiments of the present invention recognize that RF beams are not used in isolation, but are generally used as part of a network in which a number of facilities such as base stations are located in such a way as to provide coverage to immediately adjacent areas. In order to provide coverage as nearly optimum as possible, a base station should provide signals that are sufficiently strong to serve devices in its own coverage area without causing interference to devices being served by other base stations. In addition, embodiments of the invention also recognize that the ability to control vertical beams and to create vertical sectors allows for control of sector sizes and that control of beam elevation can be used to create multiple sectors having multiple radii and that the particular radii chosen can be chosen based on conditions in the area being served, including terrain, traffic load, and user distribution.

Figure 1:
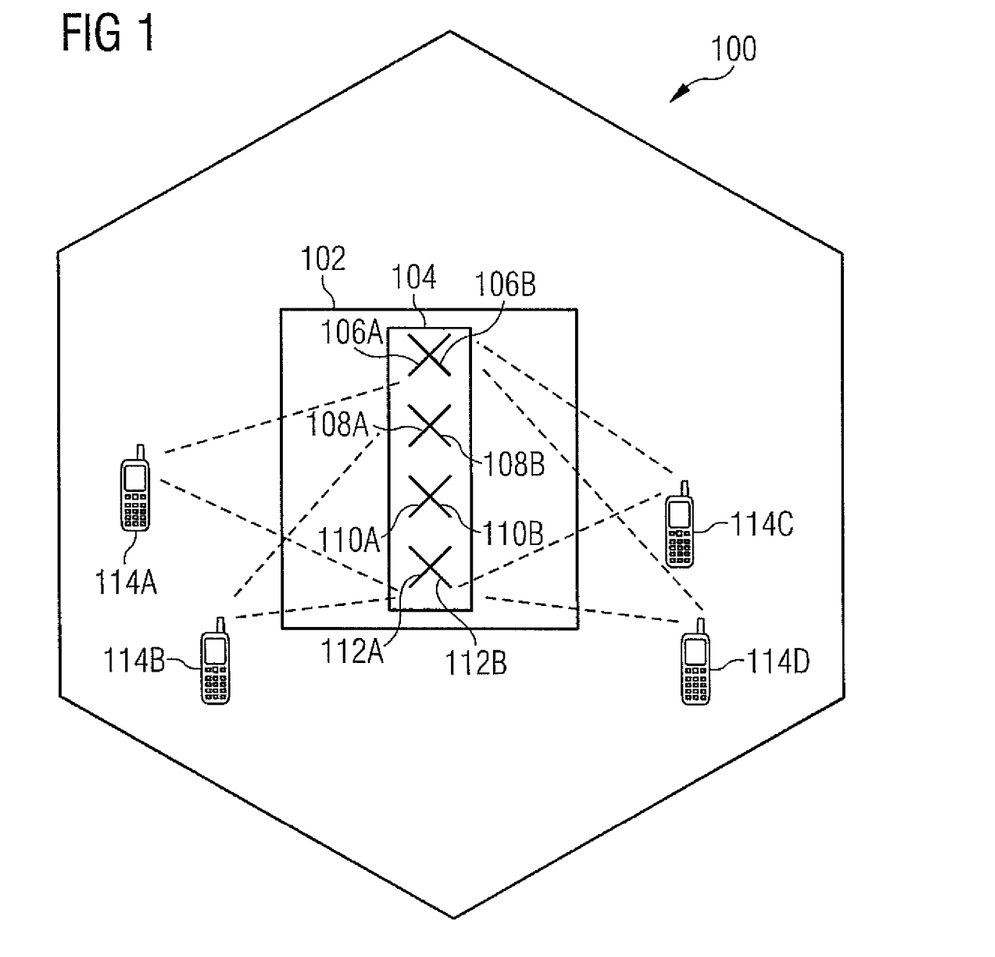
FIG. 1 illustrates a wireless communications network according to an embodiment of the present invention.

FIG. 1 illustrates a network according to an embodiment of the present invention. The network comprises a cell 100, defined as an area served by an eNB 102. The eNB 102 comprises an array panel 104, comprising sub-elements 106A and 106B, 108A and 108B, 110A and 110B, and 112A and 112B, arranged in pairs, with the pairs suitably exhibiting opposite polarizations such as +45 (for example, for the "A" elements) and −45 degrees (for example, for the "B" elements). The eNB 102 is illustrated as supporting a plurality of UEs 114A-114D. The eNB 102 is illustrated here as transmitting signals to the UEs 114A-114D, using beams directed at each of the eNBs 114A-114D, The beams are formed through control of signal components directed to the sub-elements of the array 104.

Embodiments of the present invention recognize that selection of sub-elements and combinations of sub-elements to be used for transmission can be controlled so as to create multiple logical elevation ports, as well as azimuth ports. Such ports can be used, for example, to adapt transmission in the elevation dimension as well as in the azimuth dimension. For example, each azimuth spatial stream may be steered with a single UE-specific tilt in elevation. In this case, rank, that is, spatial rank or equivalently the number of data streams supported (that is, chosen by the UE) may be effectively limited by the number of azimuth antennas at the eNB for the case of single-user spatial multiplexing. For example, in an array comprising four pairs of vertically arranged sub-elements, two elements are arranged by azimuth, so that the rank values are 1 and 2.

Embodiments of the present invention further recognize that phasing of inputs to antenna array sub-elements can be performed so as to provide more precise control of elevation and provide improved gains as compared to simply selecting elements to be used for signal components. Embodiments of the invention additionally recognize that the specific phasing and other aspects of the design may take into account conditions prevailing in base stations and affecting other user devices.

Figure 2:
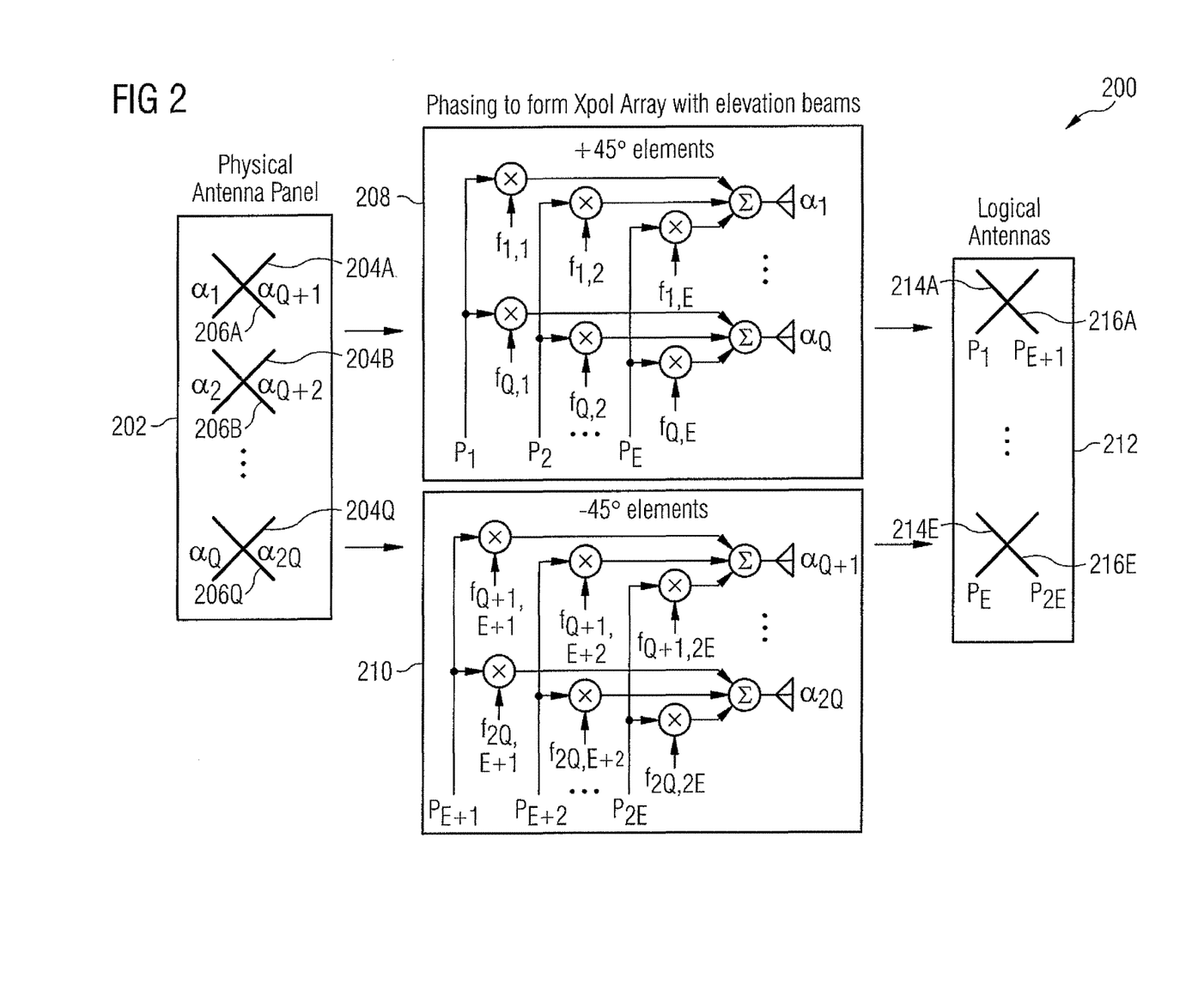
FIG. 2 illustrates an antenna array according to an embodiment of the present invention.

FIG. 2 illustrates an array 200 according to an embodiment of the present invention, comprising a physical antenna panel 202. The panel 202 is a cross-polarization panel, comprising Q co-located elements which exhibit orthogonal polarizations, such as +45 and −45 degree polarizations. The panel may create multiple beams per polarization through multi-beam phasing of co-polarization elements. Both azimuth and elevation control may be used to form multiple-sectors in a vertical direction. Each elevation beam for a given polarization may be formed using all the elements of that polarization. The physical antenna panel 202 comprises pairs of elements 204A and 206A, 204B and 206B, on through 204Q and 206Q. The elements 204A, 204B, . . . ,204Q may be designated as $\alpha_1, \alpha_2, \ldots, \alpha_Q$, respectively, and the elements 206A, 206B, . . . ,206Q may be designated as $\alpha_{Q+1}, \alpha_{Q+2}, \ldots, \alpha_{2Q}$, respectively. The elements are subjected to phasing operations 208 and 210, designed to phase all antennas of the corresponding polarization. The signals $P_1, P_2, \ldots, P_E$, supplied to the +45-degree elements, are phased by the values $f_{1,1}$ and $f_{Q,1}, f_{1,2}$ and $f_{Q2}, \ldots, f_{1,E}$ and $f_{Q,E}$. The signals $P_{E+1}, P_{E+2}, \ldots, P_{2E}$, supplied to the −45-degree elements, are phased by the values $f_{Q+1,E+1}$ and $f_{2Q,E+1}, f_{Q+1,E+2}$ and $f_{2Q,E+2}, \ldots, f_{Q+1,2E}$ and $f_{Q2,2E}$. The outputs of the phasing operations are summed to create logical ports 212 (E ports per polarization), comprising logical pairs of elements 214A and 216A through 214E and 216E. Phasing between all antennas allows significant control over effective elevation and downtilt.

The panel 202 may include 2Q sub-elements, with Q vertical elements per polarization. E beams, or vertical sectors, may be formed from the Q elements for each polarization. The result is that the panel 202 may form a logical E×2 vertical array of cross polarizations, that is, sectors with 2 vertical elements from the original 1 sector. Other embodiments may have more azimuth elements, with the elevation of the additional elements being controlled in a similar manner to the 2 azimuth antenna panel shown.

The control of elevation provided by arrays such as that illustrated in FIG. 2 can be used to produce desired radiofrequency (RF) beam patterns. In one or more embodiments of the invention, designs are directed to generation of fixed vertical-sector beams with good interference characteristics. Such characteristics include low sidelobes to reduce out of cell uplink and downlink interference, interference between sectors, or both. It will be understood that the term "low sidelobes" encompasses nulls. Generating a pattern characterized by low sidelobes aids in providing a specified beam gain to designated users.

In addition, control of elevation allows for the creation of different beamwidths in each vertical sector, and also the creation of more than one vertical sector. For example, user devices near a cell edge may benefit from a narrow beam if the majority of user devices are geographically further from the base station, assuming a uniform population of user devices. Taking another example, user devices closer to the base station may benefit from a wide beam, depending on deployment. Advantages may be gained from the use of different bandwidth combinations to provide coverage for different deployments. Also, different sectors may exhibit different downtilts, which may be produced electrically or mechanically, depending on deployment.

Design for a base station may be performed based on a number of factors such as location of interferers, the number and characteristics of vertical sectors that are desired, such as beamwidths and downtilts.

Figure 3:
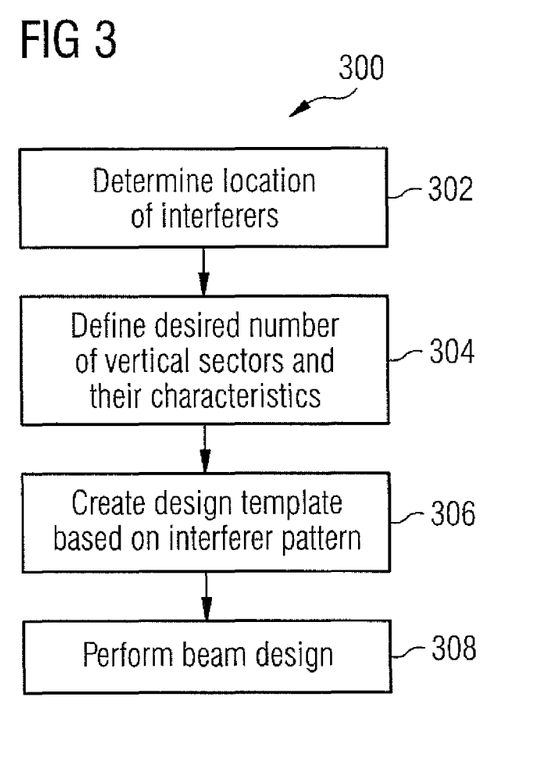
FIG. 3 illustrates a process according to an embodiment of the present invention.

FIG. 3 illustrates a process 300 of beam design for a base station according to an embodiment of the present invention. At step 302, a determination is made as to the location of interferers. For example, information defining the cell radius and possible expected mean deviation from a line of sight ray may be taken into account and an estimate made defining a pattern of interferers to be used. In addition, topology may be taken into account in determining the location of the interferers. For example, if the interferers are downhill from the base station, then the elevation angles of the interferers relative to the base station will be lower than will elevation angles of interferers which are located at approximately the same height as that of the base station. On the other hand, if the interferers are uphill from the base station then the elevation angles of the interferers relative to the base station would be higher than interferers which are located around the same height as the base station. At step 304, a desired number of vertical sectors and their characteristics is defined, with desired sector characteristics including the respective beamwidths and downtilts of each sector. For example the geographic distribution of the UEs connected to the base station could be used in determining the beamwidth. For example if more UEs are located near the cell edge, then the vertical beam serving those UEs could be more narrow than the vertical beam serving the UEs closer to the base station. At step 306, a design template is created based on the interferer pattern, including desired null locations, beamwidths, and downtilts for the vertical sectors. The design template could include a region where the interferers are dominant, where the desired users in a first sector are dominant, and where the desired users in a second sector are dominant. At step 308, the beam design is performed, such as through a least squares matching, to match the design template. Another option for the beam design could be through the solution of a generalized eigenvector problem where the beam for a given vertical sector, w, is the one that maximizes $w^H R_d w/(w^H R_i w)$ where H means Hermitian transpose, $R_d$ is a covariance matrix created as the outer product of array manifold vectors (elevation direction vectors) for the desired users in that sector and $R_i$ is a covariance matrix created as the outer product of array manifold vectors for the desired users in the other sector along with the outer product of the array manifold vectors for the out-of-cell interferers.

In one or more embodiments of the invention, multiple sets of beams may be designed. Such an approach may be taken, for example, to cover multiple interference scenarios and beam widths. These designs may be stored in a table lookup, for example, at a central repository. At installation, one of the beam sets may be chosen based on local user device distributions.

Figure 4A:
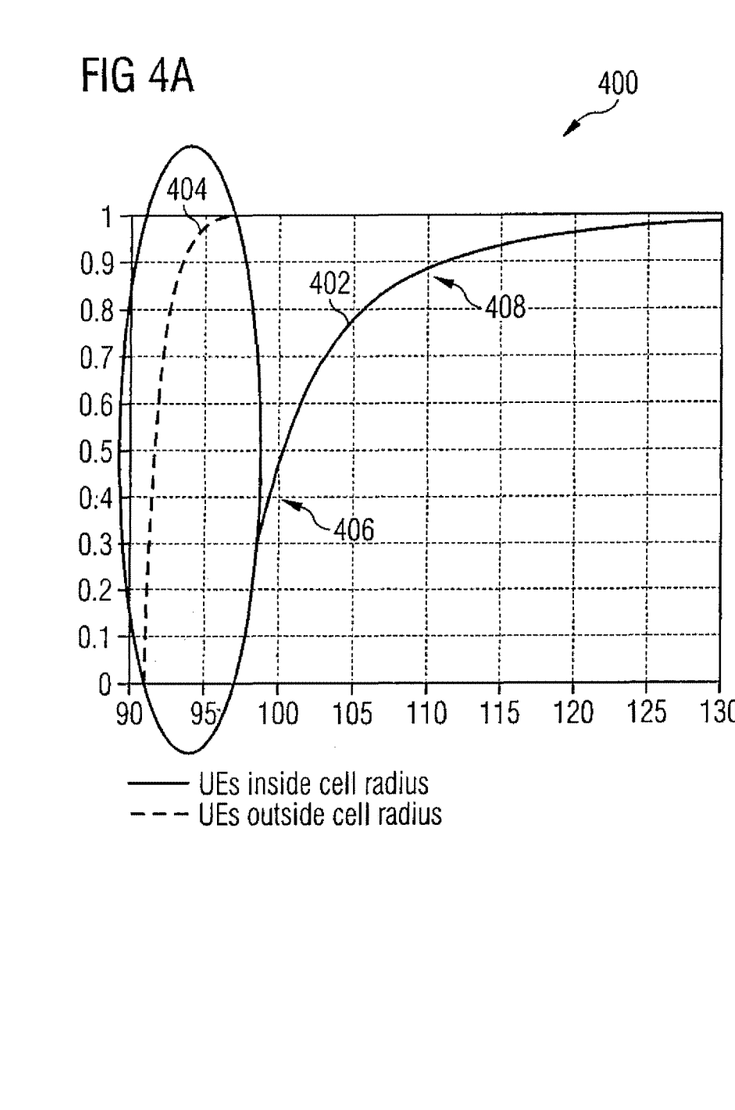
FIGS. 4-6 illustrate graphs presenting data that can be processed to determine antenna configuration according to an embodiment of the present invention.
Figure 4B:
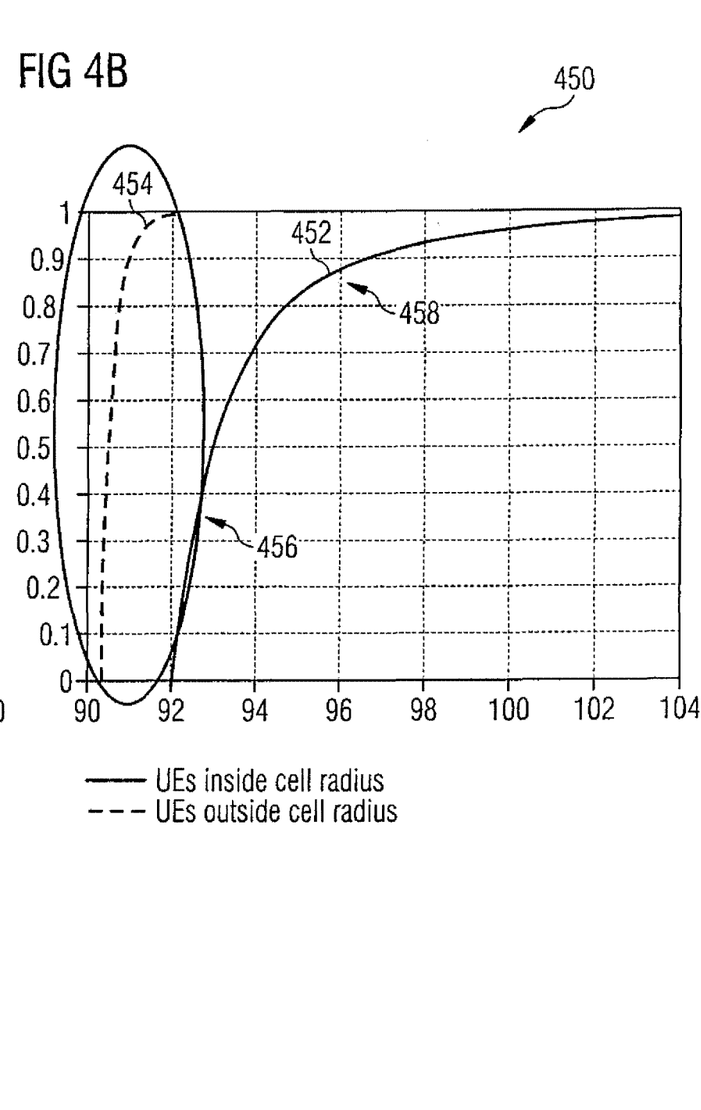

Estimates for proper elevation for user device distributions may be made based on distribution patterns that may be obtained through analysis of actual data or through estimates using appropriate techniques. FIGS. 4A and 4B, for example present graphs 400 and 450 showing a CDFs of UE elevation angles for site to site distances of 500 m 1732 m, respectively, addressing mean UE locations in elevation for a flat-earth 3GPP simulation. In these figures, as well as in FIGS. 5A, 5B, 6A, and 6B, a 90-degree elevation angle means the UE is at the same height as the base station and an angle of greater than 90 degrees means that the UE is below the base station. For example, a UE at 105 degrees in elevation is at an angle 15 degrees below the base station. The exemplary base height used is 32 m in each case. Curves 402 and 404 of the graph 400 present the probability that an elevation angle is less than the abscissa plotted against elevation angle, for UEs inside and outside the cell radius, respectively. Curves 452 and 454 of the graph 450 present the probability that an elevation angle is less than the abscissa plotted against elevation angle, for UEs inside and outside the cell radius, respectively.

In the implementation whose characteristics are illustrated by the graph 400, vertical sector beams should have nulls in their patterns between 91 and 96 degrees to significantly reduce the amount of interference they spread outside the cell on the downlink and the amount of interference received on the uplink. A narrow vertical sector is desirable at approximately the point 406, representing an elevation angle of 100 degrees, and a probability of 0.4, and a wide vertical sector is desirable at the point 408, representing an elevation angle of 110 degrees and a probability of 0.8. The widths of the sectors are chosen in this way in order to attempt to keep the number of UEs in each vertical sector as nearly equal as possible as dictated by the physics of the elevation array. Aspects of the array design may limit the degree to which the number of UEs can be equalized. For example, the array element spacing in azimuth will physically limit the width of the individual sectors.

In the implementation whose characteristics are illustrated by the graph 450, vertical sector beams should have nulls in their patterns between 91 and 92 degrees. A narrow vertical sector is desirable at approximately the point 456, representing an elevation angle of 93 degrees, and a probability of 0.35, and a wide vertical sector is desirable at the point 458, representing an elevation angle of 96 degrees and a probability of 0.85.

Figures 5A, 5B:
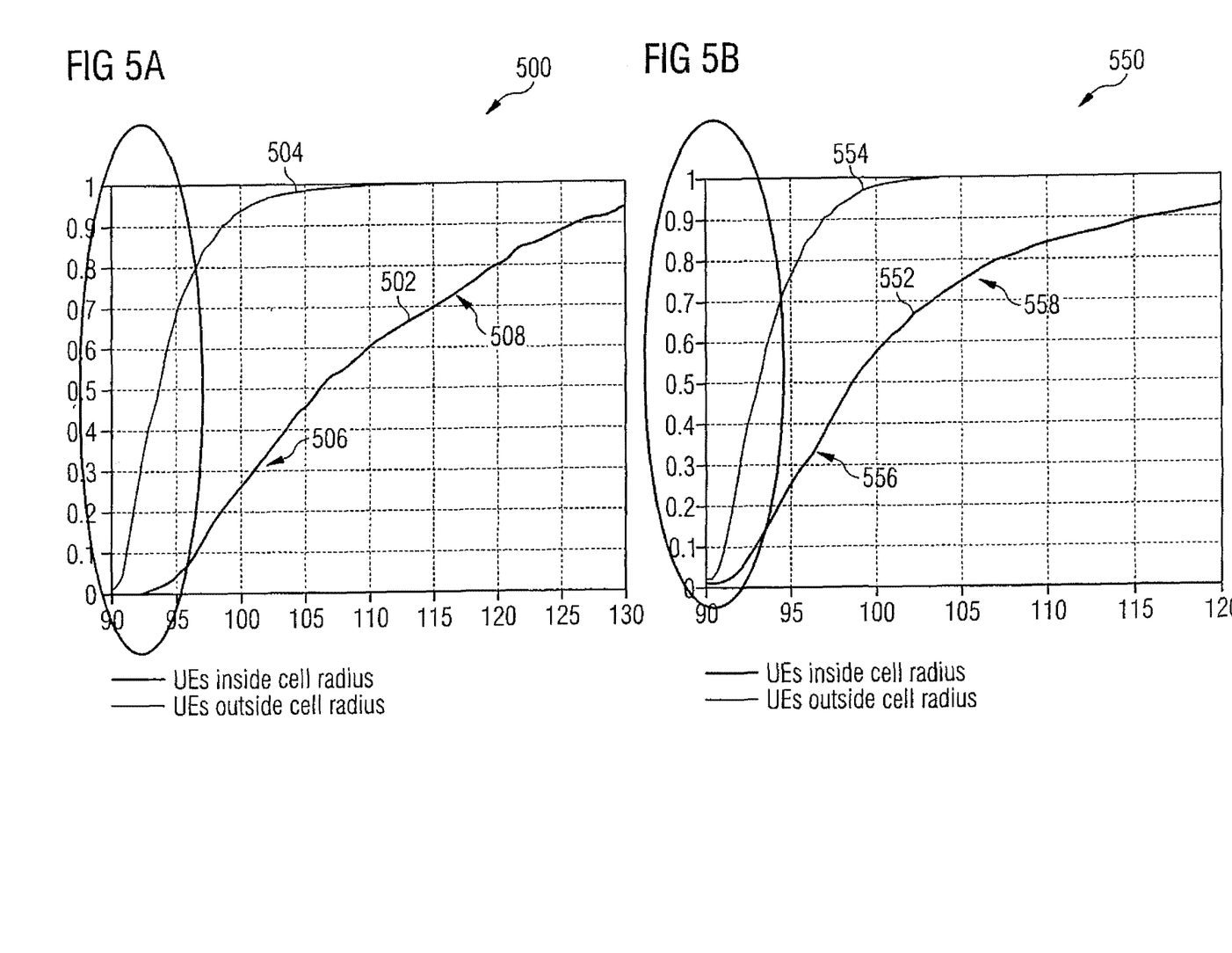

FIGS. 5A and 5B, to take another example, present graphs 500 and 550 showing a CDFs of UE elevation angles for site to site distances of 500 m and 1000 m, respectively, addressing mean UE locations in elevation for ray-tracing data. The base height used may vary in each case. Curves 502 and 504 of the graph 500 present the probability that an elevation angle is less than the abscissa plotted against elevation angle, for UEs inside and outside the cell radius, respectively. Curves 552 and 554 of the graph 550 present the probability that an elevation angle is less than the abscissa plotted against elevation angle, for UEs inside and outside the cell radius, respectively.

In the implementation whose characteristics are illustrated by the graph 500, vertical sector beams should have nulls in their patterns between 91 and 95 degrees. Equal beamwidths are desirable at vertical sectors between approximately the point 506, representing an elevation angle of 101 degrees, and a probability of 0.3, and the point 508, representing an elevation angle of 116 degrees and a probability of 0.72.

In the implementation whose characteristics are illustrated by the graph 550, vertical sector beams should have nulls in their patterns between 90 and 90 degrees. A narrow vertical sector is desirable at approximately the point 556, representing an elevation angle of 97 degrees, and a probability of 0.35, and a wide vertical sector is desirable at the point 558, representing an elevation angle of 107 degrees and a probability of 0.75.

Figure 6A:
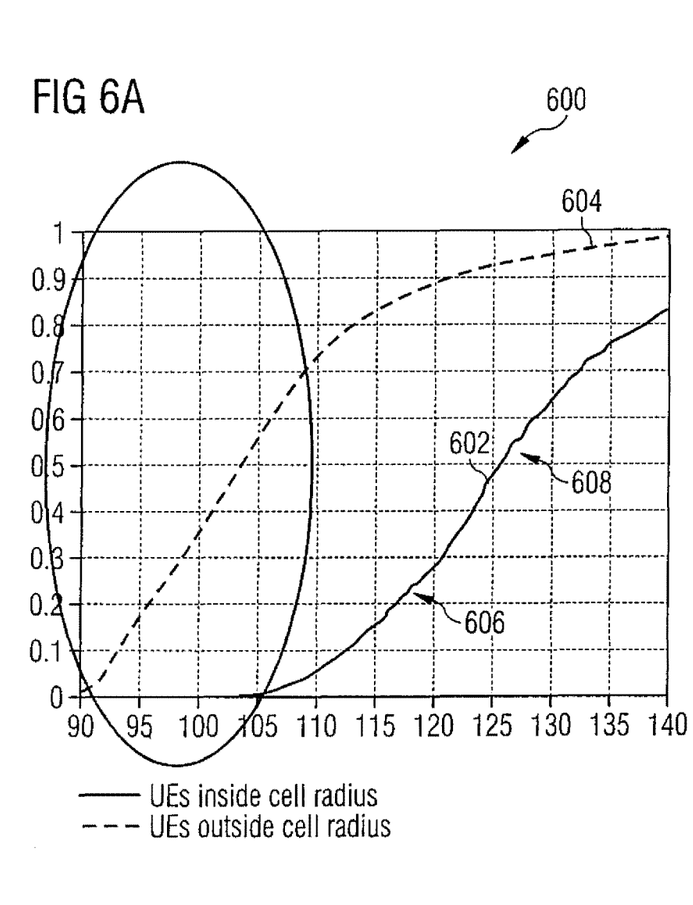
Figure 6B:
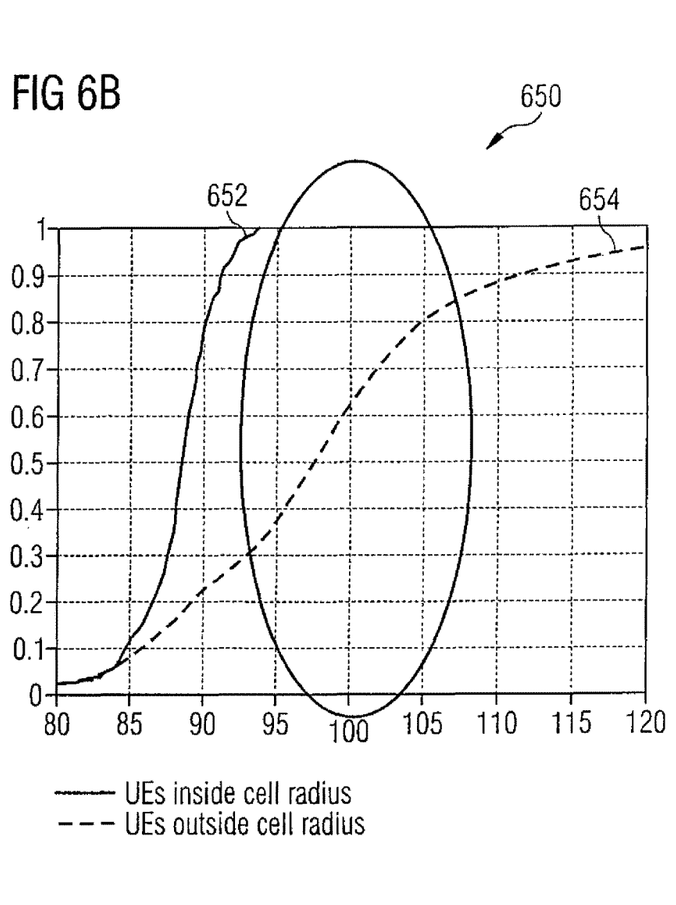

FIGS. 6A and 6B, to take another example, present graphs 600 and 650 showing CDFs of UE elevation angles for site to site distances of 500 m and 1000 m, respectively, addressing mean UE locations in elevation for ray-tracing data. The base height used may vary in each case. Curves 602 and 604 of the graph 600 present the probability that an elevation angle is less than the abscissa plotted against elevation angle, for UEs inside and outside the cell radius, respectively. Curves 652 and 654 of the graph 650 present the probability that an elevation angle is less than the abscissa plotted against elevation angle, for UEs inside and outside the cell radius, respectively.

In the implementation whose characteristics are illustrated by the graph 600, vertical sector beams should have nulls in their patterns between 90 and 110 degrees. Equal beamwidths may be desirable at vertical sectors between approximately the point 606, representing an elevation angle of 118 degrees and a probability of 0.25, and the point 608, representing an elevation angle of 127 degrees and a probability of 0.55. In the implementation whose characteristics are illustrated by the graph 650, vertical sector beams should have nulls in their patterns for angles greater than 93 degrees.

Figure 7:
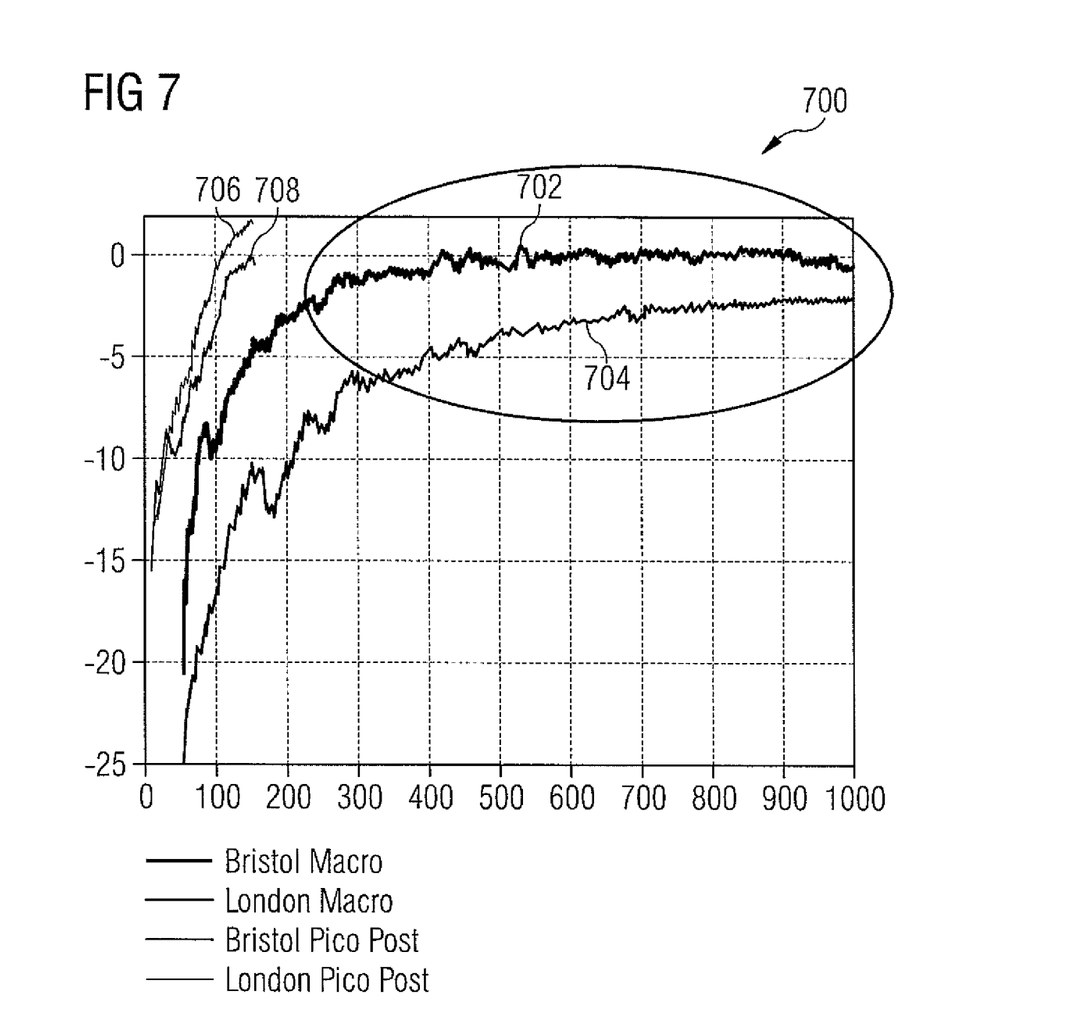
FIG. 7 illustrates a graph presenting bias information to be taken into account in determination of an antenna configuration according to an embodiment of the present invention.

The above examples reflect analysis of line of sight rays to the UEs, without consideration of elevation angle biasing. Elevation angle biasing means that the way the signal travels through the environment to the UE could make the elevation angle appear different (usually lower than expected from the line of sight direction so that the UE appears higher than it actually is in a line of sight sense). One particular example of biasing is diffraction over a rooftop where from the base station perspective the UE appears higher—that is, the UE has a lower elevation angle) than the line of sight direction. FIG. 7 illustrates a graph 700 showing characteristics of an exemplary implementation. The graph 700 illustrates the effect of bias to be taken into account in determining where to place nulls to avoid interference. The deviation from a direct ray may be expected to depend on environment. The exemplary implementation whose characteristics are implemented in FIG. 7 is a specific implementation having elements in Bristol and London. Curves 702, 704, 706, and 708 illustrate distance versus mean deviation (in degrees) from a direct line of sight for a Bristol macro eNB, a London macro eNB, a Bristol pico eNB post, and a London pico eNB post, respectively.

Figure 8:
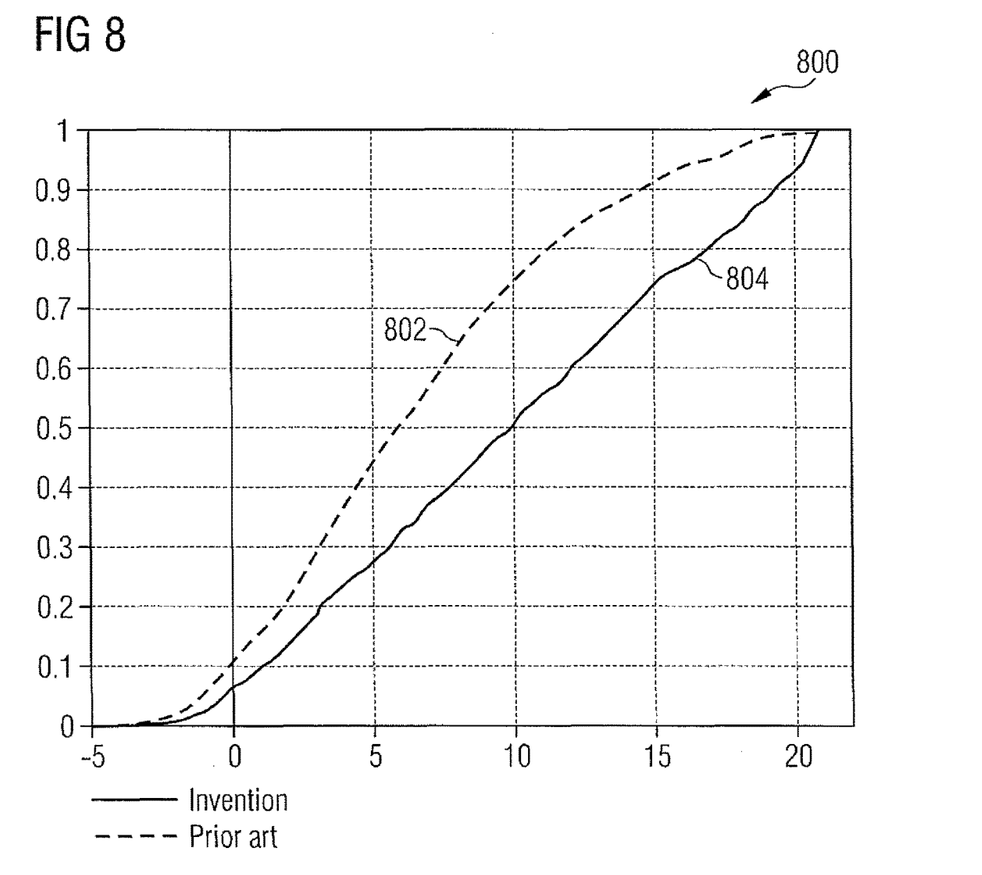
FIG. 8 illustrates simulation results showing improvements that may be achieved using antenna configuration determined using embodiments of the present invention.

FIG. 8 illustrates a graph 800 of simulation results comparing a design according to an embodiment of the present invention against a prior-art design. Curves 802 and 804 plot sum throughput, for a prior art design 802, and for a design 804 as described below, respectively.

A design according to an embodiment of the present invention may employ Q=10 azimuth antennas, with 0.9 lambda spacing. One set of results represents system level results:

Full buffer, 3GPP case 1
Single vertical beam (no vertical sectorization)
Null where interferers are expected
15 degree mechanical downtilt
Gain of 8.4% cell average and 12.7% cell edge Another set of results comprise geometry plots for vertical sectorization, with nulls in the position of interferers as well as nulls to another vertical sector. In the present example, no mechanical downtilt is used.

Figure 9:
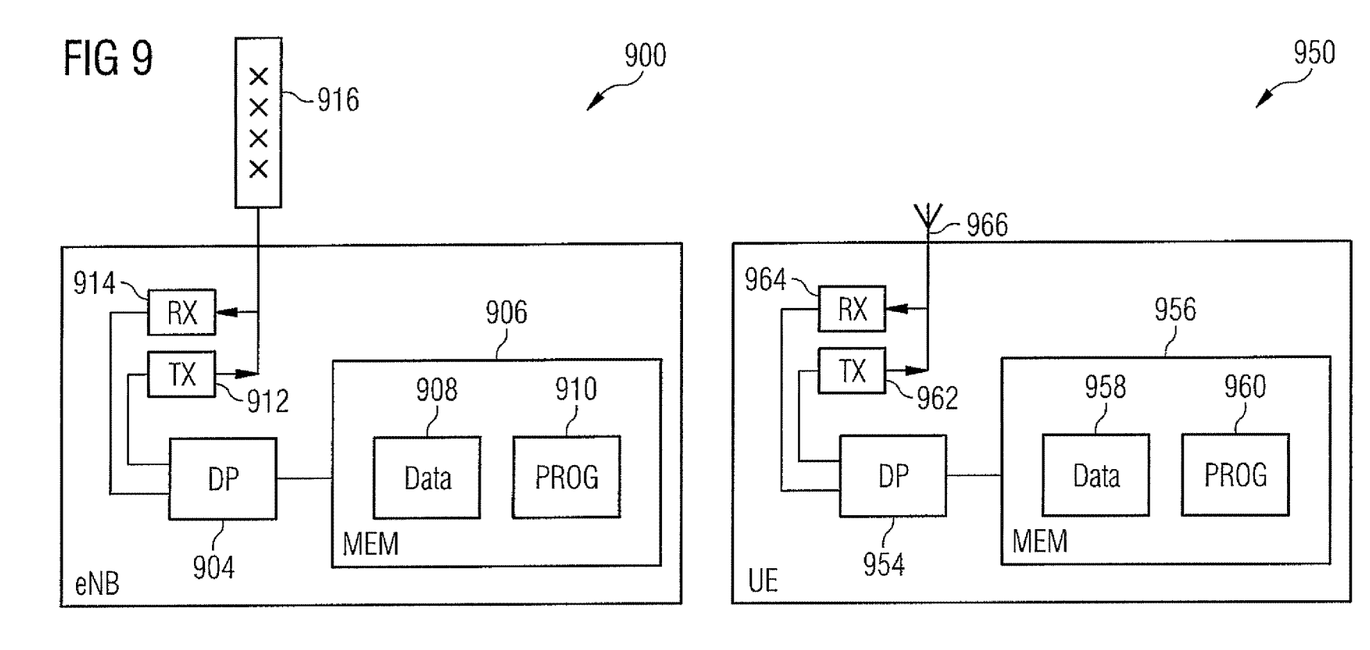
FIG. 9 illustrates elements according to one or more embodiments of the present invention.

Reference is now made to FIG. 9 for illustrating a simplified block diagram of a base station, such a macro base station or macro eNB 900 and a user device, such as a UE 950, suitable for use in practicing the exemplary embodiments of this invention. In FIG. 9 an apparatus, such as the eNB 900, is adapted for communication with other apparatuses having wireless communication capability, such as the UE 950.

The eNB 900 includes processing means such as at least one data processor (DP) 904, storing means such as at least one computer-readable memory (MEM) 906 storing data 908 and at least one computer program (PROG) 910 or other set of executable instructions, communicating means such as a transmitter TX 912 and a receiver RX 914 for bidirectional wireless communications with the UE 950 via an antenna array 916.

The UE 950 includes processing means such as at least one data processor (DP) 954, storing means such as at least one computer-readable memory (MEM) 956 storing data 958 and at least one computer program (PROG) 960 or other set of executable instructions, communicating means such as a transmitter TX 962 and a receiver RX 964 for bidirectional wireless communications with the eNB 900 via one or more antennas 966.

At least one of the PROGs 910 in the eNB 900 is assumed to include a set of program instructions that, when executed by the associated DP 904, enable the device to operate in accordance with the exemplary embodiments of this invention, as detailed above. In these regards the exemplary embodiments of this invention may be implemented at least in part by computer software stored on the MEM 906, which is executable by the DP 904 of the eNB 900, or by hardware, or by a combination of tangibly stored software and hardware (and tangibly stored firmware). Similarly, at least one of the PROGs 960 in the UE 950 is assumed to include a set of program instructions that, when executed by the associated DP 954, enable the device to operate in accordance with the exemplary embodiments of this invention, as detailed above. In these regards the exemplary embodiments of this invention may be implemented at least in part by computer software stored on the MEM 956, which is executable by the DP 954 of the UE 950, or by hardware, or by a combination of tangibly stored software and hardware (and tangibly stored firmware). Electronic devices implementing these aspects of the invention need not be the entire devices as depicted at FIG. 9 or may be one or more components of same such as the above described tangibly stored software, hardware, firmware and DP, or a system on a chip SOC or an application specific integrated circuit ASIC.

In general, the various embodiments of the UE 950 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 906, and 956 include any data storage technology type which is suitable to the local technical environment, including but not limited to, semiconductor based memory devices, magnetic memory devices and systems, optical memory devices and systems, fixed memory, removable memory, disc memory, flash memory, DRAM, SRAM, EEPROM and the like. Various embodiments of the DP 904 and 954 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   memory storing computer program code;
   wherein the memory storing the computer program code is configured to, with the at least one processor, cause the apparatus to at least:
   control radiation characteristics of a base station operating in a wireless network and providing wireless coverage over a cell, wherein controlling the radiation characteristics of the base station comprises selecting at least one beam of a set of elevation beams for emission by an antenna array of the base station, wherein the antenna array comprises an antenna panel comprising multiple elements arrayed in an elevation dimension, wherein the at least one beam of the set of beams is chosen to as to reduce interference in the elevation dimension between areas inside and outside the cell, wherein determining the configuration of the antenna array comprises creating a design template for the set of elevation beams including desired null locations and desired beamwidths and downtilts of vertical sectors and designing beams to match the design template.

2. The apparatus of claim 1, wherein the selected at least one beam of the set of elevation beams exhibits low sidelobes to reduce interference between areas inside and outside the cell.

3. The apparatus of claim 2, wherein the selected at least one beam of the set of elevation beams exhibits nulls to reduce interference between areas inside and outside the cell.

4. The apparatus of claim 1, wherein the selected at least one beam of the set of elevation beams defines at least two vertical sectors, wherein the at least one beam creating the at least two vertical sectors exhibit different beamwidths for each sector, and wherein the different beamwidths are based at least in part on number and distribution of user devices closer to or further from the base station.

5. The apparatus of claim 1, wherein selection of the at least one beam of the set of elevation beams is based at least in part on expected distribution of interferers.

6. The apparatus of claim 1, wherein selection of the at least one beam of the set of elevation beams is based at least in part on deviation from line of sight of interferers from the base station.

7. A method comprising:
controlling radiation characteristics of a base station operating in a wireless network, wherein controlling the radiation characteristics of the base station comprises selecting at least one beam of a set of elevation beams for emission by an antenna array of the base station, wherein the antenna array comprises an antenna panel comprising multiple elements arrayed in an elevation dimension, wherein the at least one beam of the set of beams is chosen to as to reduce interference in the elevation dimension between areas inside and outside the cell, wherein determining the configuration of the antenna array comprises creating a design template for the set of elevation beams including desired null locations and desired beamwidths and downtilts of vertical sectors and designing beams to match the design template.

8. The method of claim 7, wherein the selected at least one beam of the set of elevation beams exhibits nulls to reduce downlink out of cell interference and nulls to reduce uplink out of cell interference.

9. The method of claim 7, wherein the selected at least one beam of the set of elevation beams includes low sidelobes to reduce interference between sectors.

10. The method of claim 7, wherein the selected at least one beam of the set of elevation beams defines at least two vertical sectors, wherein the at least one beam creating the at least two vertical sectors exhibit different beamwidths for each sector, and wherein the different beamwidths are based at least in part on number and distribution of user devices closer to or further from the base station.

11. The method of claim 7, wherein selection of the at least one beam of the set of elevation beams is based at least in part on expected distribution of interferers.

12. The method of claim 7, wherein selection of the at least one beam of is based at least in part on deviation from line of sight of interferers from the base station.

13. The method of claim 7, wherein determining the configuration of the antenna array comprises creating a design template for the set of elevation beams including desired null locations and desired beamwidths and downtilts of vertical sectors and designing beams to match the design template.

14. The method of claim 13, wherein designing the elevation beams to match the design template is based at least in part on least squares matching.

15. A non-transitory computer readable medium storing a program of instructions, execution of which by a processor configures an apparatus to at least:
control radiation characteristics of a base station operating in a wireless network, wherein controlling the radiation characteristics of the base station comprises selecting at least one beam of a set of elevation beams for emission by an antenna array of the base station, wherein the antenna array comprises an antenna panel comprising multiple elements arrayed in an elevation dimension, wherein the at least one beam of the set of beams is chosen to as to reduce interference in the elevation dimension between areas inside and outside the cell, wherein determining the configuration of the antenna array comprises creating a design template for the set of elevation beams including desired null locations and desired beamwidths and downtilts of vertical sectors and designing beams to match the design template.

16. The non-transitory computer readable medium of claim 15, wherein the selected at least one beam of the set of elevation beams exhibits nulls to reduce downlink out of cell interference and nulls to reduce uplink out of cell interference.

17. The non-transitory computer readable medium of claim 15, wherein the selected at least one beam of the set of elevation beams includes low sidelobes to reduce interference between sectors.

18. The non-transitory computer readable medium of claim 15, wherein the selected at least one beam of the set of elevation beams defines at least two vertical sectors, wherein the at least one beam creating the at least two vertical sectors exhibit different beamwidths for each sector, and wherein the different beamwidths are based at least in part on number and distribution of user devices closer to or further from the base station.

* * * * *